(12) United States Patent
Le-Pailleur

(10) Patent No.: US 7,064,747 B2
(45) Date of Patent: Jun. 20, 2006

(54) TOUCH-SENSITIVE DETECTOR

(75) Inventor: Laurent Le-Pailleur, Voreppe (FR)

(73) Assignee: STMicroelectronics S.A., Montrouge (FR)

( * ) Notice: Subject to any disclaimer, the term of this patent is extended or adjusted under 35 U.S.C. 154(b) by 524 days.

(21) Appl. No.: 10/292,380

(22) Filed: Nov. 12, 2002

(65) Prior Publication Data

US 2003/0112226 A1   Jun. 19, 2003

(30) Foreign Application Priority Data

Nov. 13, 2001   (FR) .................................. 01 14655

(51) Int. Cl.
*G09G 5/00*   (2006.01)
(52) U.S. Cl. ..................... 345/173; 345/174; 178/18.06
(58) Field of Classification Search ................ 345/173, 345/174, 184; 382/124, 126, 123; 178/18.05, 178/18.06, 18.1, 18.01; 235/93, 451; 702/150; 250/208.1; 324/687, 686
See application file for complete search history.

(56) References Cited

U.S. PATENT DOCUMENTS

| | | | | |
|---|---|---|---|---|
| 5,325,442 A | * | 6/1994 | Knapp | 382/124 |
| 5,978,496 A | * | 11/1999 | Harkin | 382/124 |
| 6,049,620 A | * | 4/2000 | Dickinson et al. | 382/124 |
| 6,088,585 A | | 7/2000 | Schmitt et al. | |
| 6,392,636 B1 | * | 5/2002 | Ferrari et al. | 345/173 |
| 6,538,456 B1 | * | 3/2003 | Dickinson et al. | 324/658 |
| 6,836,230 B1 | * | 12/2004 | Le Pailleur et al. | 341/141 |
| 2004/0213441 A1 | * | 10/2004 | Tschudi | 382/124 |
| 2005/0062732 A1 | * | 3/2005 | Sinclair et al. | 345/184 |

FOREIGN PATENT DOCUMENTS

| | | |
|---|---|---|
| EP | 457398 A2 * | 11/1991 |
| EP | 0932117 A2 | 7/1999 |
| WO | WO 98/58342 | 12/1998 |
| WO | WO 01/82237 A2 | 11/2001 |
| WO | WO 200182237 A2 * | 11/2001 |

* cited by examiner

*Primary Examiner*—Xiao Wu
(74) *Attorney, Agent, or Firm*—Lisa Jorgenson; Jose Gutman; Fleit, Kain, Gibbons, Gutman, Bongini & Bianco, PL

(57) ABSTRACT

A touch-sensitive detector includes a detection surface and a conducting element, and a first and second set of electrodes, each set of electrodes including at least one electrode extending parallel to the detection surface and where each electrode is electrically isolated. A first and second interaction capacitor is formed by the conducting element with the first and second set of electrodes, respectively. The second interaction capacitor has a lower capacitance than the first interaction capacitor. The touch-sensitive detection element further includes a first and second set of detectors arranged for detecting a signal emitted by at least one electrode of the first set of electrodes and the second set of electrodes, respectively, and transmitted through an external element located at the electrode emitting the signal. The external element contacts the detection surface. A touch sensitive detection method is also provided.

22 Claims, 4 Drawing Sheets

TOUCH-SENSITIVE DETECTOR

CROSS-REFERENCE TO RELATED APPLICATIONS

This application is based upon and claims priority from French Patent Application No. 0114655, filed Nov. 13, 2001, the entire disclosure of which is herein incorporated by reference.

BACKGROUND OF THE INVENTION

1. Field of the Invention

The present invention relates to the field of touch-sensitive detection systems, and more specifically to touch-sensitive detection systems which detect tactile contact through a wave transmitted between an electrode and a detector.

2. Description of Related Art

Touch-sensitive detection systems which detect tactile contact through a wave transmitted between an electrode and a detector have already been proposed for portable telecommunication terminals (see, for example, U.S. Pat. No. 6,088,585). The proposed systems provide functions for identifying or authenticating the user of the terminal by recognizing his fingerprints. International Patent Application 98/58342 describes an arrangement of detectors in a line making it possible, as a user runs his finger across this line in a direction roughly perpendicular to it, to detect certain characteristics of the user's fingerprint, using a scanner, and to authenticate the user.

Touch-sensitive detection systems are commonly used to perform functions for pointing to or navigating within menus displayed on a screen. In this case, the touch-sensitive detection system identifies the movements of a finger across a detection surface, and possibly detecting a selection signal initiated by the finger, such as repeated, swift contact with this surface. There are several types of touch-sensitive detection systems in existence using different detection principles. However, these different systems have various problems that need to be addressed for commercial success.

Therefore, a need exists to overcome the problems with the prior art as discussed above, and particularly for a way to efficiently scan a user's fingerprint using a touch-sensitive device.

SUMMARY OF THE INVENTION

In view of these drawbacks, the present invention overcomes the above-mentioned drawbacks and provides a touch-sensitive element for scanning a user's fingerprint using a touch-sensitive device.

One preferred embodiment of the present invention provides a touch-sensitive detection element. The touch-sensitive detection element includes a detection surface and a conducting element. The touch-sensitive detection element also includes a first set of electrodes including at least one electrode extending parallel to the detection surface. Each of the first set of electrodes is electrically isolated and the first set of electrodes forms a first interaction capacitor with the conducting element. The touch-sensitive detection element further includes a second set of electrodes including at least one electrode extending parallel to the detection surface. Each of the second set of electrodes is electrically isolated and the second set of electrodes forms a second interaction capacitor with the conducting element. The second interaction capacitor has a lower capacitance than the first interaction capacitor. The touch-sensitive detection element further includes a first set of detectors arranged for detecting a signal emitted by at least one electrode of the first set of electrodes and transmitted through an external element located at the electrode emitting the signal. The external element contacts the detection surface. The touch-sensitive detection element further includes a second set of detectors arranged for detecting a signal emitted by at least one electrode of the second set of electrodes and transmitted through an external element located at the electrode emitting the signal.

Another preferred embodiment of the present invention further provides a touch-sensitive detection device. The touch-sensitive detection device includes a detection surface and a means for conducting. The touch-sensitive detection device also includes a first plurality of electrode means including at least one electrode means extending parallel to the detection surface. Each of the first plurality of electrode means is electrically isolated and the first plurality of electrode means forms a first interaction capacitor means with the means for conducting. The touch-sensitive detection device further includes a second plurality of electrode means including at least one electrode means extending parallel to the detection surface. Each of the second plurality of electrode means is electrically isolated and the second plurality of electrode means forms a second interaction capacitor means with the means for conducting. The second interaction capacitor means has a lower capacitance than the first interaction capacitor means. The touch-sensitive detection device further includes a first set of detecting means arranged for detecting a signal emitted by at least one electrode means of the first plurality of electrode means and transmitted through an external element contacting the detection surface at the electrode means emitting the signal and at a detector of the first set of detectors. The touch-sensitive detection device further includes a second set of detecting means arranged for detecting a signal emitted by at least one electrode means of the second plurality of electrode means and transmitted through an external element contacting the detection surface at the electrode means emitting the signal and at a detector of the second set of detectors.

One advantage of the present invention is that it allows, using one touch-sensitive detection element, two detection modes using the two sets of detectors and the two sets of electrodes in different ways. The two detection modes therefore have their own electrical power consumption characteristics. This is particularly well-suited to touch-sensitive detection devices built into devices running on batteries, such as portable radio communications terminals. This is because, for such devices, the power consumption is reduced as far as possible so as to increase the autonomy of the device. One of the touch-sensitive detection modes is then optimized to exhibit particularly low power consumption.

Within the meaning of the present invention, contact with the detection surface by a finger is also to be understood as meaning contact with this detection surface by any external element, for example a pointer stylus, which has characteristics appropriate to the application of the above principles of touch-sensitive detection and of identification of this external element. Likewise, within the meaning of the present invention, touch-sensitive contact between the detection surface and the external element is also to be understood as a brushing contact or as the external element and the detection surface being brought close together without contact, insofar as the detection device can still operate under such conditions.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
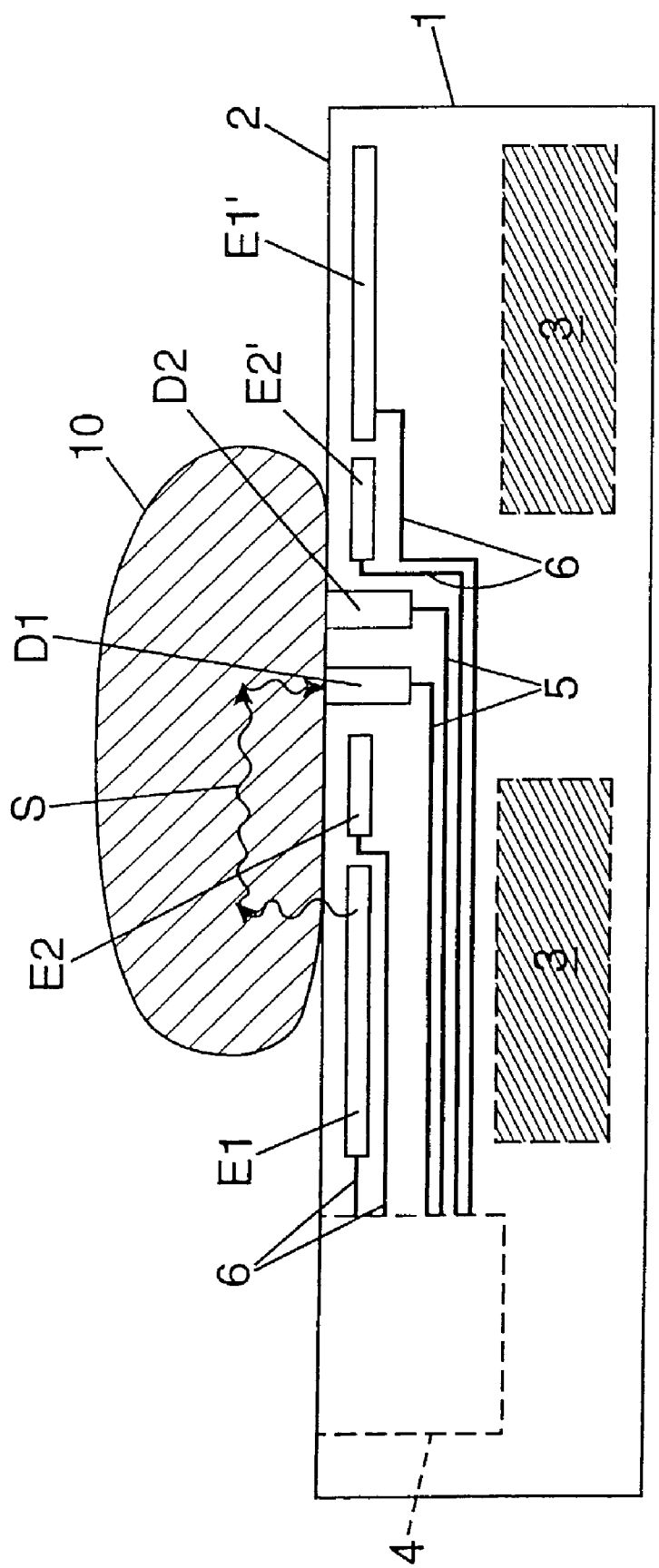
FIG. 1 is a cross section of a touch-sensitive detection element, according to one embodiment of the present invention.

Preferred embodiments of the present invention will be described in detail hereinbelow with reference to the attached drawings.

Preferred embodiments of the present invention provide a touch-sensitive detection element. The touch-sensitive detection element includes a detection surface and a conducting element. The touch-sensitive detection element also includes a first set of electrodes including at least one electrode extending parallel to the detection surface. Each of the first set of electrodes is electrically isolated and the first set of electrodes forms a first interaction capacitor with the conducting element. The touch-sensitive detection element further includes a second set of electrodes including at least one electrode extending parallel to the detection surface. Each of the second set of electrodes is electrically isolated and the second set of electrodes forms a second interaction capacitor with the conducting element. The second interaction capacitor has a lower capacitance than the first interaction capacitor. The touch-sensitive detection element further includes a first set of detectors arranged for detecting a signal emitted by at least one electrode of the first set of electrodes and transmitted through an external element contacting the detection surface at the electrode emitting the signal and at a detector of the first set of detectors. The touch-sensitive detection element further includes a second set of detectors arranged for detecting a signal emitted by at least one electrode of the second set of electrodes and transmitted through an external element contacting the detection surface at the electrode emitting the signal and at a detector of the second set of detectors.

Another embodiment of the present invention further provides a touch-sensitive detection device. The touch-sensitive detection device includes a detection surface and a means for conducting. The touch-sensitive detection device also includes a first plurality of electrode means including at least one electrode means extending parallel to the detection surface. Each of the first plurality of electrode means is electrically isolated and the first plurality of electrode means forms a first interaction capacitor means with the means for conducting. The touch-sensitive detection device further includes a second plurality of electrode means including at least one electrode means extending parallel to the detection surface. Each of the second plurality of electrode means is electrically isolated and the second plurality of electrode means forms a second interaction capacitor means with the means for conducting. The second interaction capacitor means has a lower capacitance than the first interaction capacitor means. The touch-sensitive detection device further includes a first set of detecting means arranged for detecting a signal emitted by at least one electrode means of the first plurality of electrode means and transmitted through an external element contacting the detection surface at the electrode means emitting the signal and at a detector of the first set of detectors. The touch-sensitive detection device further includes a second set of detecting means arranged for detecting a signal emitted by at least one electrode means of the second plurality of electrode means and transmitted through an external element contacting the detection surface at the electrode means emitting the signal and at a detector of the second set of detectors.

The present invention relates to touch-sensitive detection systems in which a finger of an operator in contact with a detection surface is detected by the transmission, through the finger, of a wave emitted by at least one electrode to at least one detector. The wave is emitted continuously or almost continuously by the emitting electrode or electrodes, but is detected by the detectors only upon finger contact (or touch contact) with the detection surface. Contact occurs simultaneously at one of the emitting electrodes and at least one of the detectors. The pattern of the user's fingerprint is identified by the difference in transmission of the wave from the finger to some of the detectors, depending on whether these detectors are in line with a valley or a raised point of the surface of the finger.

The detectors of the present invention are electrically isolated from each electrode and isolated from each other. The detectors and the electrodes are arranged at the detection surface so that each detector is close enough to some of the electrodes to establish coupling between each detector and some of the electrodes, upon contact of a finger or any other external element with the detection surface at the detector and at the electrodes. Thus, upon contact, a wave is transmitted from the electrode to the detector, through the finger or the external element. The distance between the detector and the electrode can be increased if the power of the wave is increased accordingly to maintain effective coupling between the detector and the emitting electrode in the presence of the finger or the external element.

In an embodiment of the present invention, the portion of the detection surface occupied by the second set of electrodes is smaller than the portion of the detection surface occupied by the first set of electrodes. Furthermore, some detectors belong both to the first and the second sets of detectors. The touch-sensitive detection element further includes an electrode controller arranged to establish electrical connections between some of the electrodes and to activate the detectors according to the sets of detectors. Two or more electrically connected electrodes simultaneously emit the same electrical signal intended to be transmitted to at least one detector through the external element coming into contact with any one of the electrodes and with the detector.

In a first touch-sensitive detection mode, the electrode controller allows a signal to be transmitted from at least one electrode, through an external element coming into contact with the detection surface, to at least one detector of the first set of detectors. The electrode controller may further allow, in the first detection mode, the establishment of a first electrical connection connecting an electrode of the first set of electrodes to at least one other electrode of the touch-sensitive detection element.

In a second touch-sensitive detection mode, the electrode controller allows a signal to be transmitted from at least one electrode of the second group of electrodes, through an external element coming into contact with the detection surface, to at least one detector of the second set of detectors. If the second set of electrodes includes at least two electrodes, the electrode controller may further allow, in this second detection mode, the establishment of a second electrical connection connecting the electrodes of the second set of electrodes together.

The first touch-sensitive detection mode corresponds to a function of identifying or authenticating a user of a device comprising the touch-sensitive detection element, from certain characteristics of his fingerprint. The second touch-sensitive detection mode corresponds to a pointing function or a navigating function.

The function of identifying the user may require activating a great number of detectors, and therefore give rise to a relatively high power consumption. Conversely, the pointing and navigating functions can each be obtained with a restricted number of detectors arranged appropriately at the detection surface, accordingly reducing the power consumption associated with this function. This distinction between the detection modes, according to their respective power consumption, is even more important as the pointing and navigating functions are generally activated for far longer than the function of identifying the user.

The touch-sensitive detection element of the present invention includes a first touch-sensitive detection mode as described previously, and two other modes (referred to as two different second touch-sensitive detection modes) having the characteristics of the second touch-sensitive detection mode described hereinabove. The first touch-sensitive detection mode corresponds to the function of identifying or authenticating the user, and the two second touch-sensitive detection modes correspond to the pointing function and to the navigating function, respectively. The pointing and navigating functions are distinguished by the number and positions of detectors activated for each one. The pointing function requires identifying the position and movement of the external element across the detection surface more precisely than does the navigating function. Specifically, the navigating function may be limited to identifying four positions of contact with the detection surface. Each position of contact corresponds to the four directions—up, down, right and left—and to an operation of selection by touch contact.

The arrangement of the emitting electrodes differ between the two functions—pointing and navigating. As a result, the power consumption of the touch-sensitive detection mode associated with the navigating function may be lower than that of the detection mode associated with the pointing function. This provides an advantage for providing two different touch-sensitive detection modes—pointing and navigating. The above association of the first and second touch-sensitive detection modes with the functions of identifying the user, pointing and/or of navigating, respectively, is given merely by way of example. Another embodiment of the present invention includes associating the first touch-sensitive detection mode with the pointing function and a second touch-sensitive detection mode with the navigating function.

The touch-sensitive detection element of the present invention also includes a third touch-sensitive detection mode including a standby mode in which functions of the device incorporating the touch-sensitive detection element are non-operational, and from which they are rendered operational. In the third touch-sensitive detection mode, the electrode controller allows detection of a contact of an external element with the detection surface at two electrodes by the change, upon contact, in an impedance between the two electrodes. For a touch-sensitive detection element comprising at least three electrodes, the electrode controller allows establishment of at least one electrical connection between two electrodes. An appropriate distribution of the set of electrodes into two groups of electrodes isolated electrically from one another, and appropriately covering the detection surface, results in improved detection of contact of an external element with any part of the detection surface.

Exemplary embodiments of the present invention will now be described in detail with reference to FIGS. 1–4.

According to FIG. 1, the touch-sensitive detection element 1 includes the detection surface 2 with which an external element 10 comes into touch contact. The external element 10 is the finger of a user of a device including the touch-sensitive element 1. The touch-sensitive detection element 1 also includes the conducting parts 3 which are parts made of metal or of a polysilicon that behaves like metal. Conducting parts 3 are held at a reference potential.

Detectors D1, D2 are arranged at the detection surface 2. Electrodes E1, E1', E2, E2' are arranged parallel to the detection surface and are covered with a hard layer affording protection against the wear caused by repeated touch contact. The electrodes are distributed between a first set of electrodes that groups together the electrodes E1 and E1' and a second set of electrodes that groups together the electrodes E2 and E2'. The electrodes E1, E1' of the first set of electrodes have a high interaction capacitance with the conducting parts 3 (on the order of 10 nanofarads) because of their large area. The electrodes E2, E2' of the second set of electrodes have a far smaller area and therefore have an interaction capacitance with the conducting parts 3 which is far lower (on the order of 0.1 nanofarad).

To detect a contact between the finger 10 of the user and the detection surface 2, some of the electrodes emit a signal S which is transmitted via the finger 10 to at least some of the detectors D1 and D2 upon contact of the finger with the detection surface. The signal S is a high-frequency wave, with a frequency on the order of one megahertz. The power consumption of the touch-sensitive detection element 1 in operation is to a large extent due to the electrical interaction between the electrodes emitting the wave and the conducting parts 3 of the touch-sensitive detection element 1. The power consumption depends on the interaction capacitance between the electrodes activated to emit the wave and the conducting parts 3. An electrode controller 4 is connected to the detectors D1, D2 by respective metal connections 5, and to the various electrodes E1, E1', E2, E2' by respective metal connections 6.

Figure 2:
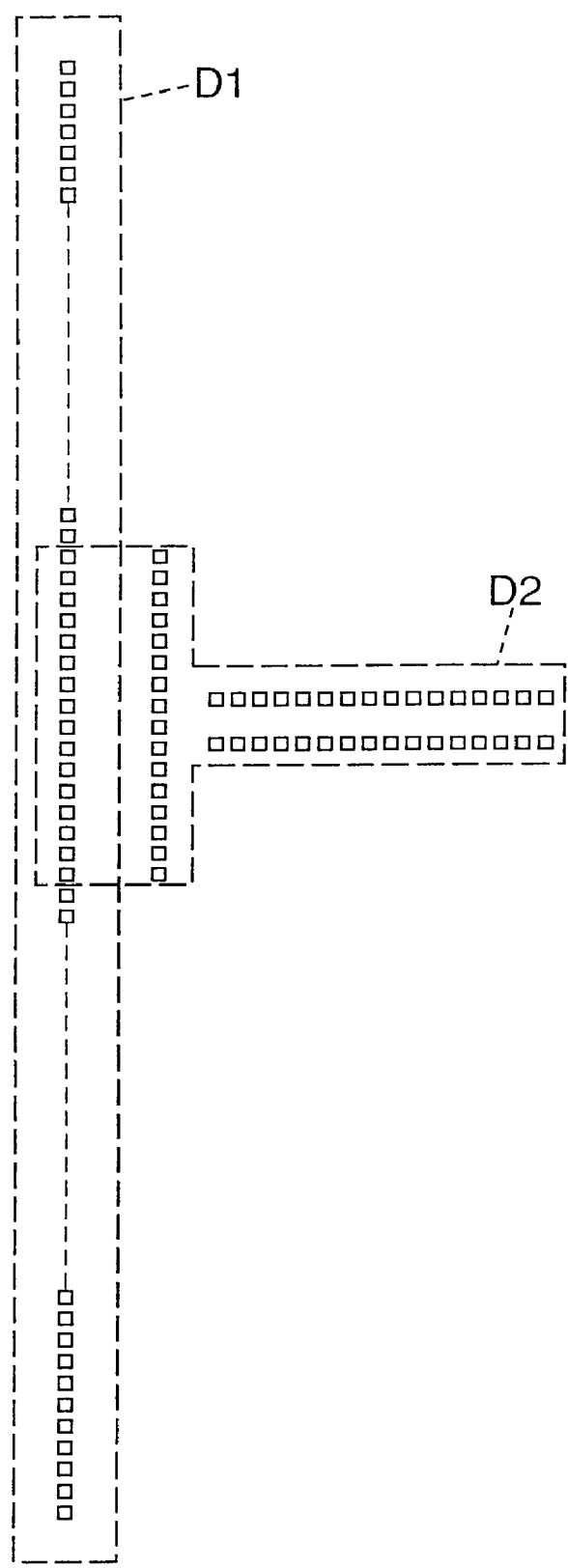
FIG. 2 shows an example of the distribution of detectors at the detection surface of the touch-sensitive detection element of the present invention.

FIG. 2 illustrates a particular arrangement of the detectors at the detection surface 2. The detectors are split into two sets of detectors D1, D2. The detectors in the first set D1 are arranged in a line which includes 256 individual detectors. The length of the line (about 15 millimeters) corresponds approximately to the width of a finger. The detectors in the first set of detectors D1 are allocated to the function of identifying or authenticating the fingerprint of the user. In the detection mode corresponding to this function, the user runs his finger across the line of detectors D1 in a direction roughly perpendicular to this line, allowing the detectors D1 to detect certain characteristics of his fingerprint.

As depicted by FIG. 2, the detectors of the second set of detectors D2 are arranged in four straight segments. The first two segments are parallel to each other and each include sixteen individual detectors. The segments have lengths of 1 millimeter and are parallel to the detectors of the first set of detectors D1. The detectors of one of the segments are common with the first set of detectors D1. Two other segments of detectors of the second set of detectors D2, which are parallel to each other, each include sixteen individual detectors. The last two segments of detectors are perpendicular to the first two segments of detectors D2, allowing the movements of the user's finger across the detection surface 2 to be identified in two mutually orthogonal directions. In the following, the references D1 and D2 denote the detectors belonging to the corresponding groups introduced above.

Figure 3:
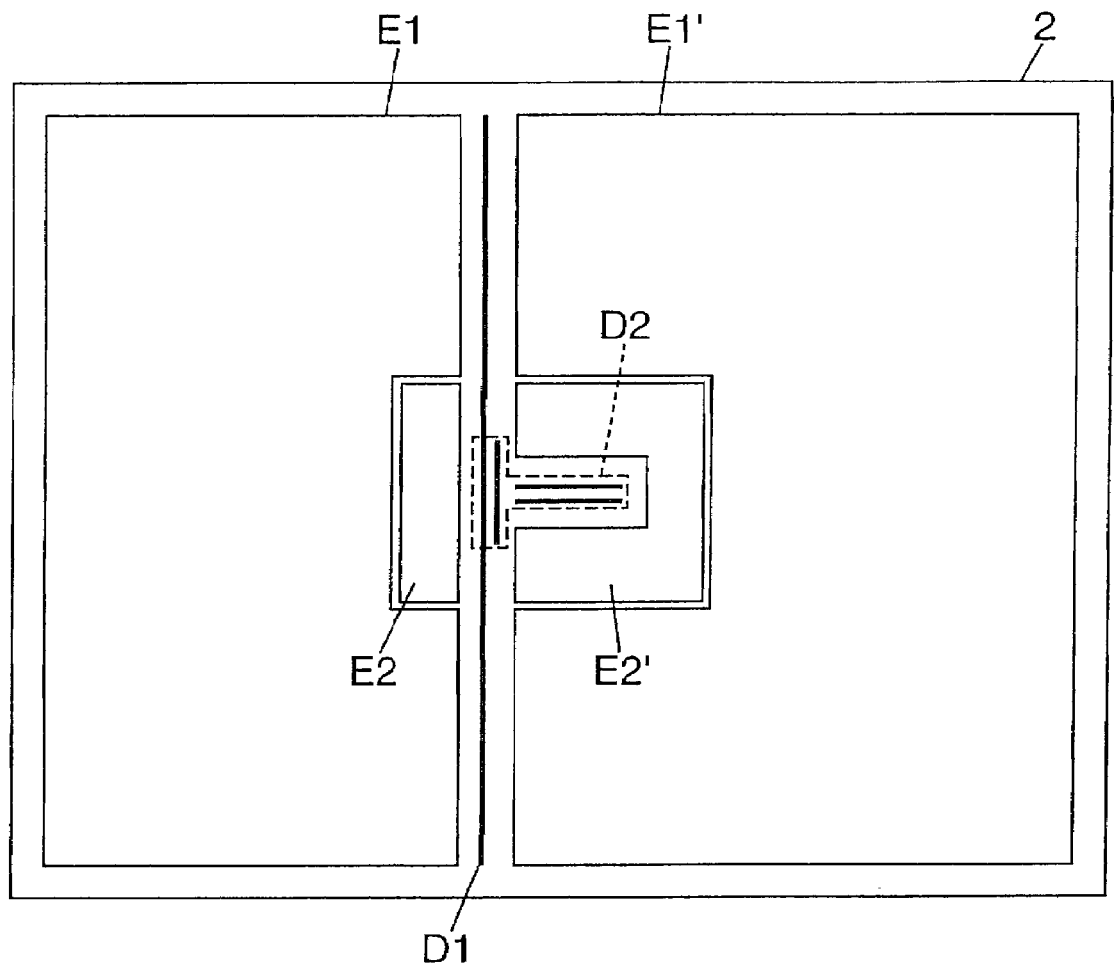
FIG. 3 shows an example of the arrangement of electrodes at the detection surface of the touch-sensitive detection element of the present invention, for the distribution of detectors according to FIG. 2.

FIG. 3 depicts the preferred embodiment of the present invention. The detection surface 2 includes the two sets of detectors D1 and D2 arranged as described previously. The first set of electrodes includes the two electrodes E1 and E1'. In the configuration depicted, the two electrodes E1, E1' are located one on each side of the line of detectors D1 of the first set of detectors. The two electrodes E2 and E2' approximately surround the detectors D2 of the second group of detectors. The two electrodes E2 and E2' are arranged in such a way that each detector D2 of the second group of detectors is near at least one of the electrodes E2, E2'.

In the detection mode corresponding to the function of identifying or authenticating the fingerprint of the user, the electrodes E1 and E1' are connected together by the electrode controller 4. The electrodes E1 and E1' therefore simultaneously emit the high-frequency wave S intended to be transmitted via the finger 10 of the user to some of the detectors D1 of the first set of detectors, upon contact of the finger simultaneously with at least one of the two electrodes E1, E1' and some of the detectors D1 of the first set of detectors. The two electrodes E2 and E2' are also, in this mode of operation, connected electrically to the two electrodes E1 and E1' by the electrode controller 4, giving better transmission of the wave S to the finger 10 and allowing better detection of the wave by the detectors D1 of the first set of detectors. The connection of several electrodes via the controller 4 improves fingerprint detection sensitivity.

In the mode of operation corresponding to the pointing function, only the two electrodes E2 and E2' emit the wave S. The two electrodes E2 and E2' are connected together by the electrode controller 4 and are electrically isolated from the other two electrodes E1 and E1'. The detectors D2 of the four segments of detectors therefore perceive the wave S upon contact of the finger 10 of the user with the detection surface 2 at the detectors and at one of the two electrodes E2 and E2' at least. Because of the small area of the electrodes E2 and E2' involved in the mode of operation corresponding to the pointing function, the power consumption of this mode of operation is lower than that of the mode of operation corresponding to the identification function.

Figure 4:
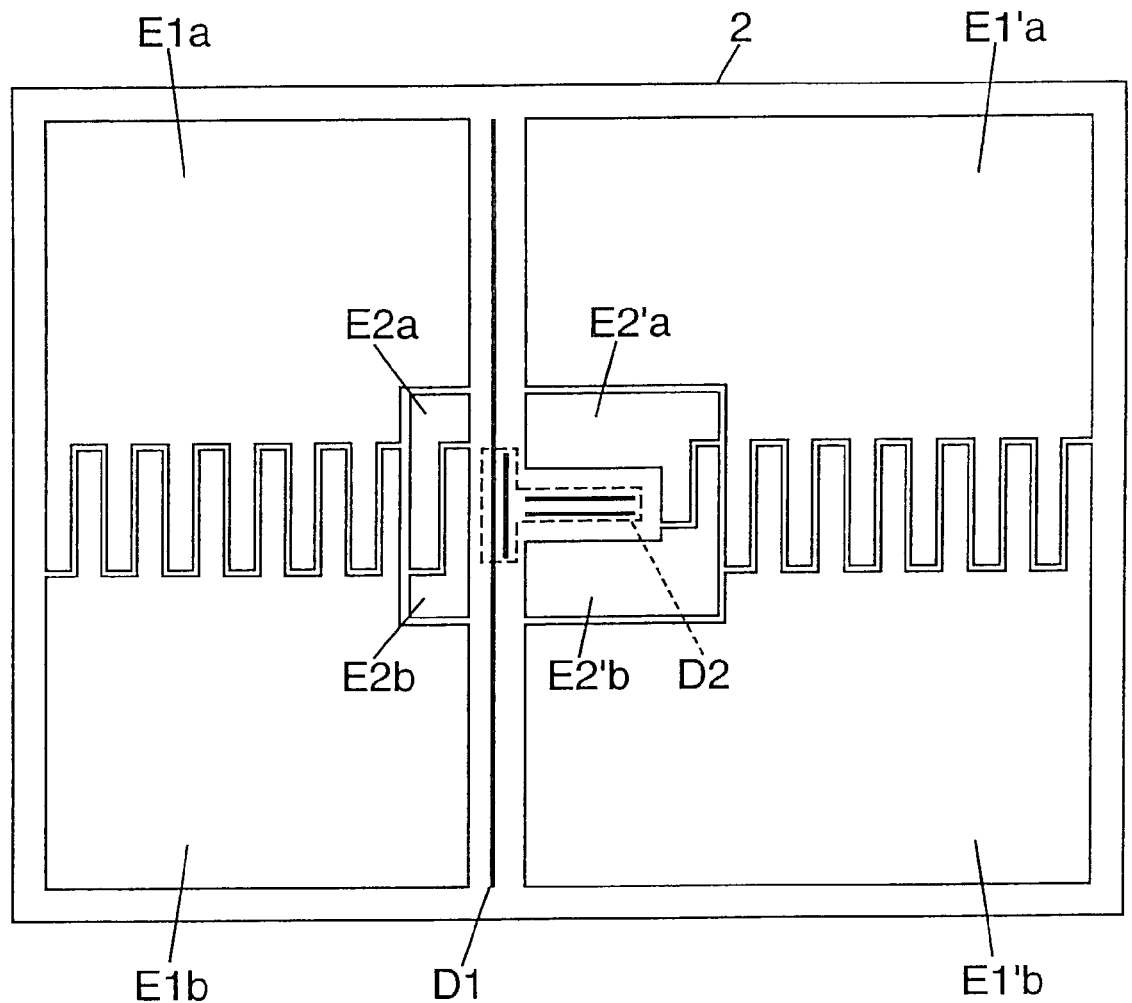
FIG. 4 shows another example of the arrangement of electrodes at the detection surface of the touch-sensitive detection element of the present invention, for the distribution of detectors according to FIG. 2.

FIG. 4 depicts an arrangement of electrodes at the detection surface 2 of the touch-sensitive detection element 1, which is an alternative to the layout depicted in FIG. 3. FIG. 4 corresponds to the same layout of the detectors D1 and D2 in FIG. 3. In this layout, each electrode E1, E1', E2, E2' of FIG. 3 is split respectively into two electrodes suffixed a and b. In each of the two modes of operation corresponding to the identification, or authentication, and pointing functions, the two electrodes suffixed a and b, corresponding to the same electrode in FIG. 3, are electrically connected by the electrode controller 4. The two modes of operation are therefore identical to those described previously.

In a third mode of operation corresponding to the standby mode of a device incorporating the touch-sensitive detection element 1, the electrodes E1a, E1'a, E2a and E2'a are connected by the electrode connector 4. Furthermore, the electrode controller 4 connects the electrodes E1b, E1'b, E2b and E2'b, keeping them electrically isolated from the electrodes of the previous group. In standby mode, the contact of the finger 10 of the user with the detection surface 2 is detected by the variation in an impedance between the two groups of electrodes. The impedance detected is of resistive or capacitive nature depending on the embodiment of the detection surface 2, or of an intermediate nature with a resistive component and a capacitive component.

The variation in impedance is greater the closer the electrodes of each group are to those of the other group, and even if the electrodes have contours which are imbricated with those of the other. This is because upon contact of the finger 10 with at least one electrode of each group, the contribution of the impedance of the finger 10 to the impedance between the two groups of electrodes is very small. The impedance between the two groups of electrodes upon contact of the finger 10 is therefore very much different from the impedance between the two groups of electrodes in the absence of the finger 10. In addition, a configuration in which the electrodes of each group are highly imbricated with the electrodes of the other group improves the effectiveness with which contact of the finger 10 is detected, irrespective of the point on the detection surface 2 that is touched by the finger.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein.

Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A touch-sensitive detection element, comprising:
   a detection surface;
   a conducting element;
   a first set of electrodes including at least one electrode extending parallel to the detection surface, each electrode electrically isolated, the first set of electrodes forming a first interaction capacitor with the conducting element;
   a second set of electrodes including at least one electrode extending parallel to the detection surface, each electrode electrically isolated, the second set of electrodes forming a second interaction capacitor with the conducting element, the second interaction capacitor having a lower capacitance than the first interaction capacitor;

a first set of detectors arranged for detecting a signal emitted by at least one electrode of the first set of electrodes and transmitted through an external element contacting the detection surface at the electrode emitting the signal and at a detector of the first set of detectors; and a second set of detectors arranged for detecting a signal emitted by at least one electrode of the second set of electrodes and transmitted through an external element contacting the detection surface at the electrode emitting the signal and at a detector of the second set of detectors.

2. The touch-sensitive detection element of claim 1, wherein the portion of the detection surface corresponding to the second set of electrodes is smaller than the portion of the detection surface corresponding to the first set of electrodes.

3. The touch-sensitive detection element of claim 1, further comprising at least one detector belonging both to the first set of detectors and to the second set of detectors.

4. The touch-sensitive detection element of claim 1, further comprising:

an electrode controller having a first touch-sensitive detection mode wherein a signal is transmitted from at least one electrode through an external element contacting the detection surface to at least one detector of the first set of detectors, and having a second touch-sensitive detection mode wherein a signal is transmitted from at least one electrode of the second set of electrodes through an external element contacting the detection surface to at least one detector of the second set of detectors.

5. The touch-sensitive detection element of claim 4, wherein in the first touch-sensitive detection mode a first electrical connection is established between an electrode of the first set of electrodes to at least one other electrode.

6. The touch-sensitive detection element of claim 4, wherein the second set of electrodes comprises at least two electrodes, and wherein in the second touch-sensitive detection mode, a second electrical connection is established between the electrodes of the second set of electrodes.

7. The touch-sensitive detection element of claim 4, the electrode controller having a third touch-sensitive detection mode for detecting a contact of an external element with the detection surface at two electrodes by a change in an impedance between the two electrodes upon contact.

8. The touch-sensitive detection element of claim 7, comprising at least three electrodes, and wherein in the third touch-sensitive detection mode at least one electrical connection is established between two electrodes.

9. A touch-sensitive detection device, comprising:

a detection surface;

means for conducting;

a first plurality of electrode means including at least one electrode means extending parallel to the detection surface, each electrode means electrically isolated, the first plurality of electrode means forming a first interaction capacitor means with the means for conducting;

a second plurality of electrode means including at least one electrode means extending parallel to the detection surface, each electrode means electrically isolated, the second plurality of electrode means forming a second interaction capacitor means with the means for conducting, the second interaction capacitor means having a lower capacitance than the first interaction capacitor means;

a first set of detecting means arranged for detecting a signal emitted by at least one electrode means of the first set of electrode means and transmitted through an external element located at the electrode means emitting the signal, the external element contacting the detection surface; and a second set of detecting means arranged for detecting a signal emitted by at least one electrode means of the second set of electrode means and transmitted through an external element located at the electrode means emitting the signal, the external element contacting the detection surface.

10. The touch-sensitive detection device of claim 9, wherein the portion of the detection surface corresponding to the second set of electrode means is smaller than the portion of the detection surface corresponding to the first set of electrode means.

11. The touch-sensitive detection device of claim 9, further comprising at least one detecting means belonging both to the first set of detecting means and to the second set of detecting means.

12. The touch-sensitive detection device of claim 9, further comprising:

means for controlling electrode means having a first touch-sensitive detection mode wherein a signal is transmitted from at least one electrode means through an external element contacting the detection surface to at least one detecting means of the first set of detecting means, and having a second touch-sensitive detection mode wherein a signal is transmitted from at least one electrode means of the second set of electrode means through an external element contacting the detection surface to at least one detecting means of the second set of detecting means.

13. The touch-sensitive detection device of claim 12, wherein in the first touch-sensitive detection mode a first electrically connecting means is established between an electrode means of the first set of electrode means to at least one other electrode means.

14. The touch-sensitive detection device of claim 12, wherein the second set of electrode means comprises at least two electrode means, and wherein in the second touch-sensitive detection mode, a second electrically connecting means is established between the electrode means of the second set of electrode means.

15. The touch-sensitive detection device of claim 12, the means for controlling electrode means having a third touch-sensitive detection mode for detecting a contact of an external element with the detection surface at two electrode means by a change in an impedance between the two electrode means upon contact.

16. The touch-sensitive detection device of claim 15, comprising at least three electrode means, and wherein in the third touch-sensitive detection mode, at least one electrically connecting means is established between two electrode means.

17. A touch-sensitive detection method employing a touch-sensitive detection element comprising a detection surface, a conducting part, a first and a second sets of detectors arranged at the detection surface, a first and a second sets of electrodes, each set of electrodes comprising at least one electrode extending parallel to the detection surface, all the electrodes being in themselves electrically isolated in pairs, the first and second sets of electrodes each forming, with the conducting part of the touch-sensitive detection element, a respective interaction capacitor, each detector of the first set of detectors being arranged to detect a signal emitted by at least one electrode of the first set of electrodes and transmitted from one of the emitting electrodes through an external element coming into contact with the detection surface at this detector and at this electrode, each detector of the second set of detectors being arranged to detect a signal emitted by at least one electrode of the second set of electrodes and transmitted from one of the emitting electrodes through an external element coming into contact with the detection surface at this detector and at this electrode, wherein, with the interaction capacitor of the second set of electrodes with the conducting part having a lower capacitance than the interaction capacitor of the first set of electrodes with the conducting part, the touch-sensitive detection method comprises:

in a first touch-sensitive detection mode, detectors of the first set of detectors detecting a signal emitted by at least one electrode and transmitted through the external element upon contact of this element with the detection surface; and in at least one second touch-sensitive detection mode, detectors of the second set of detectors detecting a signal emitted by at least one electrode of the second set of electrodes and transmitted through the external element upon contact of the external element with the detection surface.

18. The touch-sensitive detection method according to claim 17, wherein the first touch-sensitive detection mode comprises establishing a first electrical connection connecting an electrode of the first set of electrodes to at least one other electrode of the touch-sensitive detection element.

19. The touch-sensitive detection method according to claim 17, wherein, the second set of electrodes comprising at least two electrodes, and wherein the second touch-sensitive detection mode comprising establishing a second electrical connection connecting the electrodes of the second set of electrodes together.

20. The touch-sensitive detection method according to claim 17, further comprising a third touch-sensitive detection mode in which a contact of an external element with the detection surface at two electrodes of the touch-sensitive detection element is detected by the change in an impedance between these two electrodes.

21. The touch-sensitive detection method according to claim 20, wherein the touch-sensitive detection element comprises at least three electrodes, and wherein the third touch-sensitive detection mode comprises establishing at least one electrical connection between two electrodes.

22. An electronic apparatus incorporating a touch-sensitive detection element comprising a detection surface, a conducting part, a first and a second sets of detectors arranged at the detection surface, a first and a second sets of electrodes, each set of electrodes comprising at least one electrode extending parallel to the detection surface, all the electrodes being in themselves electrically isolated in pairs, the first and second sets of electrodes each forming, with the conducting part of the touch-sensitive detection element, a respective interaction capacitor, each detector of the first set of detectors being arranged to detect a signal emitted by at least one electrode of the first set of electrodes and transmitted from one of the emitting electrodes through an external element coming into contact with the detection surface at this detector and at this electrode, each detector of the second set of detectors being arranged to detect a signal emitted by at least one electrode of the second set of electrodes and transmitted from one of the emitting electrodes through an external element coming into contact with the detection surface at this detector and at this electrode, wherein the interaction capacitor of the second set of electrodes with the conducting part has a lower capacitance than the interaction capacitor of the first set of electrodes with the conducting part.

* * * * *